March 18, 1924.

H. TRENCHAM

DISTRIBUTION SYSTEM

Filed Aug. 23, 1921

1,487,294

Inventor:
Henry Trencham,
by Albert E. Davis
His Attorney.

Patented Mar. 18, 1924.

1,487,294

UNITED STATES PATENT OFFICE.

HENRY TRENCHAM, OF RUISLIP, ENGLAND, ASSIGNOR TO GENERAL ELECTRIC COMPANY, A CORPORATION OF NEW YORK.

DISTRIBUTION SYSTEM.

Application filed August 23, 1921. Serial No. 494,636.

*To all whom it may concern:*

Be it known that I, HENRY TRENCHAM, a subject of the King of Great Britain, residing at "Belsaye," Ruislip, county of Middlesex, England, have invented certain new and useful Improvements in Distribution Systems, of which the following is a specification.

The object of my invention is to provide improvements in electric power distribution systems, and in methods of protecting them against faults.

In systems involving the supply of large amounts of power it becomes necessary in order to maintain supply to arrange feeder lines, etc., so that generally there is more than one supply path to each important point of power consumption, and to employ protective devices for these feeders such that on the occasion of a fault in any one of them, that one only shall be automatically and instantaneously disconnected from the system.

The most generally successful method of protecting the feeders of a power network is by a system which depends for its discriminating action on a difference between the amount of power supplied at one end of a feeder and that delivered at the other. The present invention relates to a system of this character, and is applicable particularly to lines run at very high voltage, and most advantageously where each of the various poles or phases comprise a separate cable.

According to my invention, at least one more cable is provided than is actually necessary for supplying power, that is to say *n* plus one cables are provided where *n* cables only would be required for normal operation. Thus for a three-phase feeder, four separate cables or lines, all of the same size, will be provided and switching arrangements made so that the fourth line can be connected up so as to replace any one of the others; thus acting as a spare. During normal operation, however, the fourth line is not connected to the high pressure system at all, but is used as part of a secondary system, arranged to protect the power supplying lines, by acting as a pilot wire connecting the two ends. The system is best applied where, in the separate cables used, arrangements are made so that faults between phases are not likely to take place.

My invention will be better understood from the following description taken in connection with the accompanying sheet of drawings, and its scope will be pointed out in the appended claims.

Figure 1:
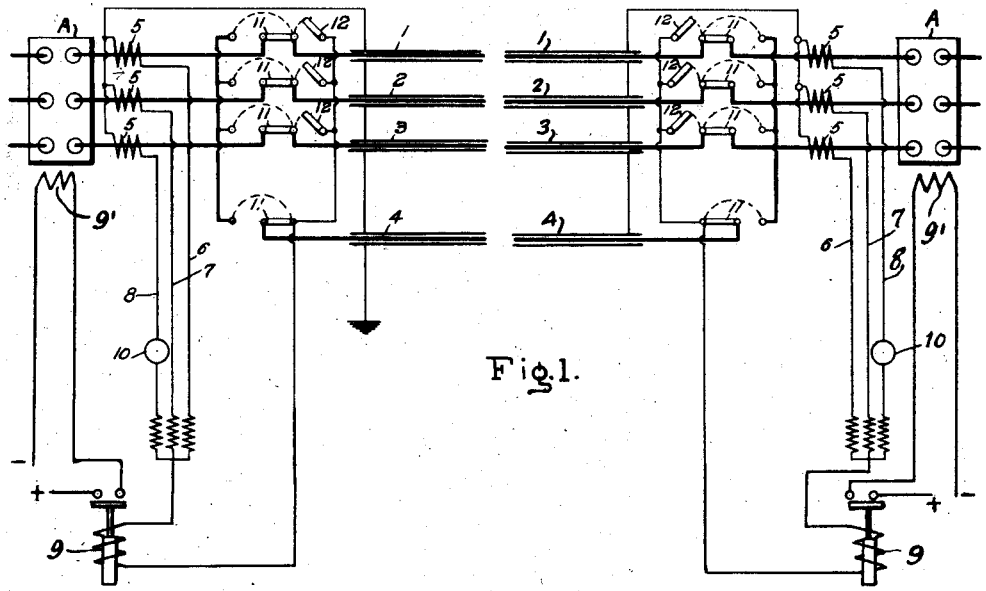
Figure 2:
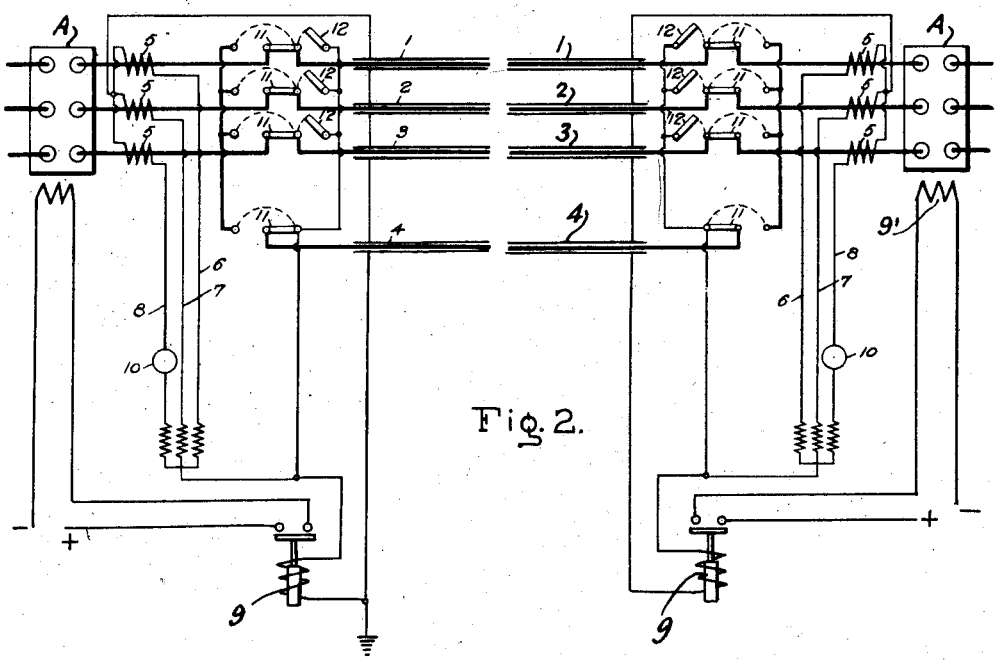

Fig. 1 illustrates diagrammatically an embodiment of my invention, and Fig. 2 illustrates diagrammatically a modification of my invention.

In both Figs. 1 and 2, I have illustrated my invention, as applied to a three-phase feeder comprising separate insulated lead covered cables 1, 2 and 3, for the various phases and shown the method of operation of the protective system. In such a feeder any fault occurring on a cable would be a fault to earth, as an earthed lead sheath covers each live conductor. Further the amount of fault current would generally be limited by means of an earthing resistance in the neutral of the distribution system. Faults between phases on the cables themselves are practically impossible, and means to protect against such faults would not be required, or if supplied, would only be considered as a standby protection.

A current transformer 5 is provided at each end of each of the cables or feeders 1, 2 and 3 and the three transformers applying to the cables carrying power at each end would have the commencing ends of their secondary windings connected together, and also their finishing ends through conductors 6, 7 and 8.

In these circumstances, while the line carries normal three-phase currents, the starting and finishing points of the secondary windings of the transformers will be at the same potential, and no current would flow through a relay 9 or other device connected between these neutral points and arranged to control suitable switches such as circuit breakers A at the ends of a feeder or section 1, 2, 3 by closing, for example, the control circuits of trip coils 9' in a manner well known to the art. Furthermore, instruments or meters 10 may be included within the individual current transformer circuits without impairing their function as protective transformers. On the occurrence of an earth fault, however, on any of the cables, current would tend to flow between the neutral points, and will operate the relays 9 which complete the control circuits of the trip coils 9' of the circuit breakers A, the opening of which isolates the section or feeder 1, 2, 3.

In order to insure in the present system that only faults occurring within the length of the cable protected will operate the corresponding switches A, the transformer group at one end is connected to that at the other end, through appropriate relays by means of the spare cable 4, the return circuit being through earth, or preferably through the lead sheath of this cable. These transformer secondaries may be connected so that on the occurrence of an earth fault beyond the cable, the relays on the feeder itself are unaffected. This may be done either by arranging that the unbalanced electromotive forces in the two transformer systems oppose each other, as shown in Fig. 1, and so prevent current flowing through the relays, or that they provide circulating currents, the relays 9 being connected across suitably arranged equipotential points, as shown in Fig. 2. Switches 11 are provided in the feeders to enable the spare feeder 4 to be substituted for any of the main feeders 1, 2 or 3. Isolating switches 12 are also provided to enable any one of the feeders 1, 2 or 3 to be utilized as the protecting circuit instead of the feeder 4. For example, if cable 3 were at fault, the circuit breakers A would be operated through the closing of their trip coil circuits by the relays 9. The section 1, 2, 3 is thus isolated or dead and the switches 11 and 12 may be operated. Switches 11 of cables 3 and 4 are now operated, that is, turned to their other position as indicated by the dotted lines, thus cutting cable 3 out of the line and cutting in cable 4 to replace cable 3. Also the lowest of the switches 12, those corresponding to cable 3 are then operated, that is, turned to their other position as indicated by the dotted lines, thus cutting cable 3 into the protective or pilot circuit to replace cable 4. The line or section 1, 2, 3 is now ready for service and the circuit breakers A may be closed.

The following advantages appertain to this system of supply and protection viz:

In the event of a fault in one cable, it is possible to substitute the spare cable quickly for the one which is faulty, and to resume service. If the damage to the faulty cable is not of serious character, it may be at once used as the pilot in its turn, and the protective system need not necessarily be disconnected while the faulty cable is being repaired, as while healthy service is being maintained the protective line is subject to no electrical pressure, and is always earthed at one point.

In healthy operation, owing to there being no pressure on the cable acting as the pilot, there is no tendency to trip the relays through capacity currents.

As the cable acting as a pilot is insulated for the full line pressure, the margin of safety is very much higher than is the case in the ordinary arrangement of pilot wires.

The amount of fault current required to trip can be kept small, as the sectional area of the cable acting as the pilot is comparatively large, and its resistance, together with that of the return circuit, is small by comparison with the resistance of standard pilot cables.

Owing to the low setting of fault current obtainable, faulty cables can be tripped out with a minimum of damage.

Balancing of transformers does not present any grave difficulty, in view of the fact that the amount of fault current can have a known maximum possible value, through the provision of an earthing resistance.

Owing to the low resistance of the secondary system and to complete freedom from capacity current disturbance, the length of feeder which can be economically protected is much greater than on systems involving the use of special pilot cables.

The protective transformers can also be used for operating meters and instruments.

In feeders, where it is possible for faults between phases to occur, any well known arrangement operative in response to such faults may be employed in addition to the protection for faults to earth for discriminative protection between faults to earth and faults between phases.

The advantages of this system when additional means have to be installed for protection against faults between phases, are not so marked as in the arrangements described, but are still such as to present points of superiority over arrangements at present in use.

It will be evident that this system of protection is applicable to single or two phase, as well as to three phase systems.

Although I have shown and described my invention in considerable detail, I do not wish to be limited to the specific details thereof, as shown and described, but may use such modifications, substitutions, or equivalents thereof, as are embraced within the scope of my invention.

What I claim as new and desire to secure by Letters Patent of the United States, is,—

1. A power transmitting system comprising $n$ plus one cables of which $n$ cables are required for normal operation, a pilot circuit comprising the spare cable, means responsive to an electrical condition of the power system connected in said pilot circuit, and switching means arranged to be operated to interchange said spare cable and any one of the other cables.

2. A protective system for electric power distribution systems comprising the combination with the power supplying cable of a distribution system of a spare cable, current transformers at the ends of the power supplying cables connected together in a secondary protective circuit including said spare cable, and means adapted to be operated to transfer the power from any one of the cables of the distribution system to the spare cable upon the occurrence of a fault on the distribution system.

3. A protective system for electric power distribution systems comprising the combination with the power supplying cables of a distribution system of a spare cable, current transformers operatively related to the distribution system and connected together in a secondary protective circuit including said spare cable, means adapted to be operated to substitute said spare cable for any one of the cables of said distribution system and to transfer the protective circuit from the spare cable to the replaced cable.

4. A protective system of the class described comprising the combination with the power supplying cables of a distribution system of a spare cable therefor, current transformers operatively related to said power supplying cables and connected in a pilot circuit including said spare cable, electro-responsive means operatively related to the pilot circuit, means adapted to be operated to substitute said spare cable for any one of the cables of the distribution system and to connect the replaced cable in the pilot circuit.

5. A sectionalized power transmitting system comprising $n$ plus one cables of which $n$ cables are required for normal operation, means responsive to earth faults on the system comprising current transformers located at each end of a section and connected in a pilot circuit comprising the core and sheath of the spare cable so that the current in the pilot circuit is a measure of the difference between the input and output of the section, and switching means arranged to be operated to interchange said spare cable and any one of the other cables.

In witness whereof, I have hereunto set my hand this 29th day of July, 1921.

HENRY TRENCHAM.